United States Patent [19]
Nijenhuis

[11] Patent Number: 5,318,400
[45] Date of Patent: Jun. 7, 1994

[54] PICK-UP DEVICE FOR LOADS

[75] Inventor: Derk Nijenhuis, Hoogeveen, Netherlands

[73] Assignee: N.C.H. Hydraulische Systemen B.V., Hoogeveen, Netherlands

[21] Appl. No.: 877,189

[22] PCT Filed: Feb. 25, 1991

[86] PCT No.: PCT/NL91/00031

§ 371 Date: Aug. 3, 1992

§ 102(e) Date: Aug. 3, 1992

[87] PCT Pub. No.: WO91/12983

PCT Pub. Date: Sep. 5, 1991

[30] Foreign Application Priority Data

Feb. 26, 1990 [NL] Netherlands .......................... 9000455

[51] Int. Cl.$^5$ .............................................. B66F 11/00
[52] U.S. Cl. .................................... 414/441; 414/437
[58] Field of Search ............... 414/434, 437, 441, 458, 414/459, 494, 498, 500, 559; 254/2 R

[56] References Cited

U.S. PATENT DOCUMENTS

| 1,774,181 | 8/1930 | McCall et al. ............... 254/2 R |
| 2,823,818 | 2/1958 | Chastain et al. ............... 414/494 |
| 3,250,513 | 5/1966 | Fenner et al. ............... 414/458 X |
| 3,261,487 | 7/1966 | Talbert ............... 414/458 |
| 3,298,705 | 1/1967 | Neaverson et al. ............... 254/2 R |
| 3,570,694 | 3/1971 | Tantlinger ............... 414/458 |
| 4,114,941 | 9/1978 | Heaton ............... 414/559 X |
| 4,570,959 | 2/1986 | Grinwald ............... 414/458 X |
| 4,737,063 | 4/1988 | van den Pol ............... 414/500 X |
| 4,743,158 | 5/1988 | Hodges ............... 414/559 X |
| 5,006,032 | 4/1991 | Riedl et al. ............... 414/458 |

FOREIGN PATENT DOCUMENTS

| 0272080 | 10/1964 | Australia ............... 414/458 |
| 1803280 | 10/1971 | Fed. Rep. of Germany . |
| 380717 | 9/1932 | United Kingdom . |
| 788348 | 12/1957 | United Kingdom . |
| 1150869 | 5/1969 | United Kingdom . |
| 1532536 | 11/1978 | United Kingdom . |

Primary Examiner—Michael S. Huppert
Assistant Examiner—James Keenan
Attorney, Agent, or Firm—Bachman & LaPointe

[57] ABSTRACT

A pick-up device for a load includes a shaft having a central axis, rollers disposed on the shaft, an engagement device pivotably mounted to the shaft for engaging the load, the engagement device being mounted to the shaft at a distance from the central axis, a pulling member for pulling the load, the pulling member being disposed on the shaft at a distance from the central axis so that a pulling force applied to the pulling member applies a torque to the shaft so as to pivot the engagement device in a direction of lifting of the load; and a cam disposed on the shaft and the engagement device for preventing further pivot of the engagement device relative to the shaft when the load has been lifted a desired height.

9 Claims, 4 Drawing Sheets

PICK-UP DEVICE FOR LOADS

The invention relates to a pick-up device for loads, having means for engaging on the load and lifting it at one end over a low height, with one or more rollers so that the load can then be shifted with the pick-up device relative to a bearing face over which the rollers can move bearing the load.

The object of the invention is more particularly to provide such a pick-up device which can lift a load, in particular a so-called container, such as the so-called ISO container, at one end over a low height, so that it can be pulled onto, for example, the loading platform of a lorry through the rollers moving over the loading platform thereof. In this case the load need not be shifted, but the loading platform can be taken horizontally under the load, for example by reversing the lorry, as known per se (see, for example, U.S. Pat. Nos. 4,051,968, 4,492,507 or 4,026,429).

More particularly, the object of the invention is to provide a pick-up device of the above-mentioned type which is simple in design and reliable in operation, and which can easily and quickly engage on and be detached from the load.

To this end, a pick-up device of the type mentioned in the preamble is according to the invention characterized in that the engagement devices are designed in such a way that they can engage on the load at a distance from the axis of the rollers, and in that the device has engagement devices for a flexible pulling element such as a cable or chain, in order to move the load with said pick-up device over said bearing face, which engagement devices for said pulling element are also situated at a distance from the axis of the rollers, in such a way that the pulling force of a pulling element engaging thereon tries to swing the pick-up device relative to the rollers in the direction in which the load is thus being lifted.

If there is sufficient resistance to the horizontal movement of the load, then after the engagement of the device on the load the pulling element will initially not be capable of moving said load horizontally, so that the couple formed by the pulling force and the arm thereof up to the axis of the rollers exerts an upward swinging couple on the engagement devices on the load in order to lift the latter locally. If after said lifting the resistance to horizontal displacement of the load is reduced sufficiently (for example through the fact that it now rests only at the other end on the ground), then the load will be able to shift horizontally on further pulling on the pulling element, and during lifting a state of equilibrium is reached in which no further lifting takes place, but the load is moved horizontally. Instead of this, it is, for example, possible to reverse a tipping bridge or tilted loading platform of the lorry until it is below the load, while the load is taken up on the tipping bridge or the loading platform without horizontal movement by simultaneously with said reversing and to the same degree shortening the pulling element with a winch on the lorry. The reversing can also be produced by shortening the pulling element.

The invention also relates to a preferred embodiment of this principle, in which said engagement devices pivoting on the further device with bearings for the rollers engage on an eccentric shaft lying parallel to the axis of the rollers and at a distance from them between said axis and the engagement point on the load, and in which a cam is fitted both on said further device and on said engagement devices, placed in such a way that when, under the influence of the pulling element, said further device is rotated about the axis of the rollers in the direction of lifting of the load said cams come out of a position at a distance from each other into contact with each other.

Consequently, on the exertion of pull by the pulling element the eccentric shaft will move about the axis of the rollers and thereby lift the load slightly near the engagement devices, either through the resistance to horizontal movement of the load over its base at the other end, or through a connection of the engagement devices to the load which does not permit angular rotation or through a connection which limits such angular rotation in one direction, as will be discussed below. The couple for lifting is in this way transferred to the engagement devices via the relatively small lever arm of the eccentric shaft.

When the cams come into contact with each other thereafter, further lifting of the load at that end is limited due to the fact that the pulling element now has to exert a much greater force in order to lift the load further, since the couple for lifting is now transferred to the engagement devices via the relatively large lever arm of the engagement devices themselves, while in the case of a connection of the engagement devices to the load which does not permit any angular rotation further lifting is not even possible without lifting the load in its entirety, also by the other end. The load can thus be lifted at the end on which the pick-up device engages until the resistance to this by the preferred embodiment discussed becomes too great. In a practical embodiment the lifting path can be, for example, 1.5 cm, which is sufficient to take the load with the rollers of the pick-up device onto a tipping bridge or loading platform of the type mentioned which can have a rear end which thins off and onto which the rollers pass easily.

The invention will now be explained in greater detail with reference to appended drawings, in which.

Figure 1:
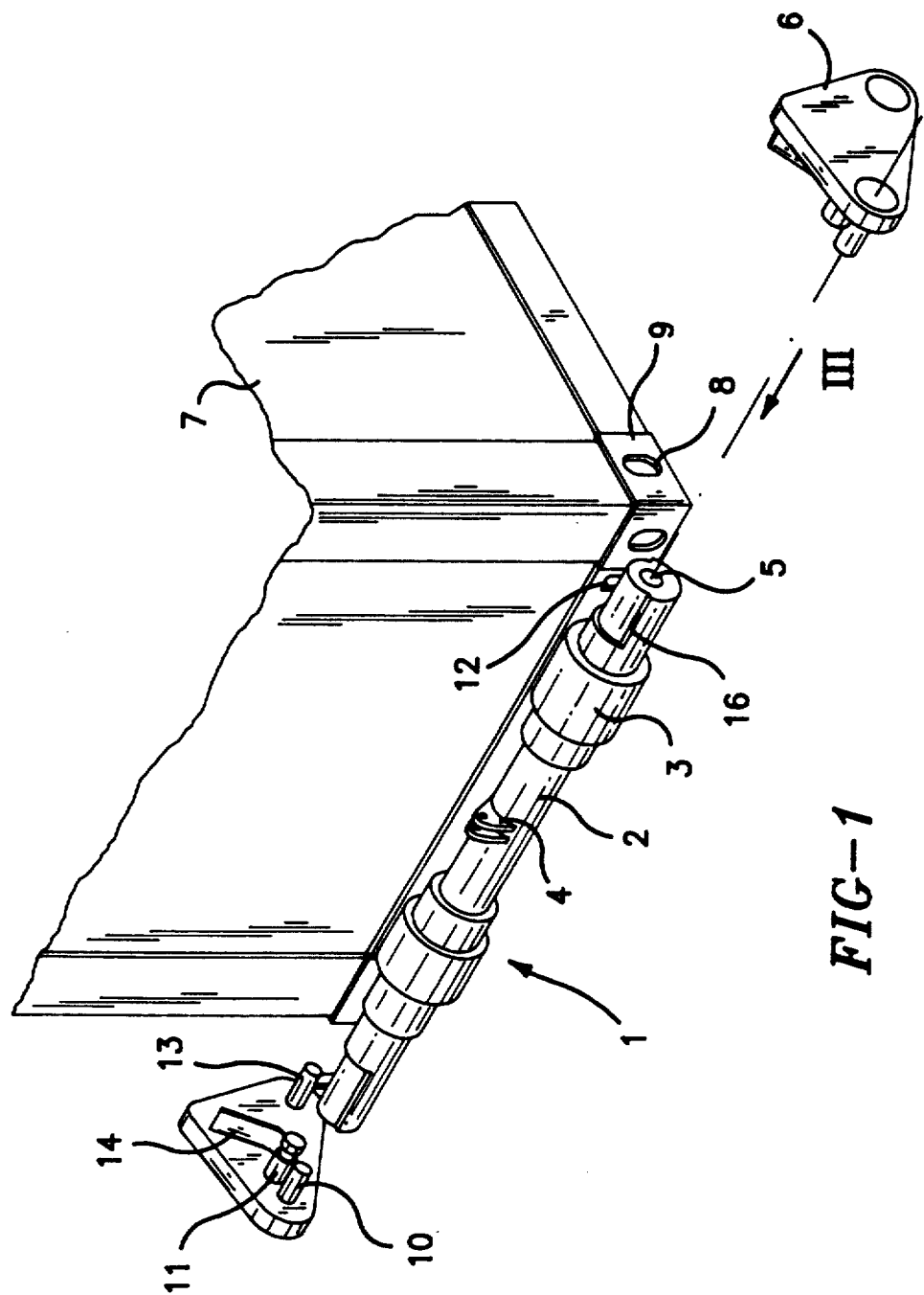
FIG. 1 is a perspective view of a pick-up device according to the invention with adjacent ISO container to be lifted and with the engagement devices removed.

In FIG. 1 the pick-up device 1 comprises a shaft 2 around which rollers 3 are rotatably fixed, and on which engagement devices can be fitted on the shaft 2 on either side in the direction of the axis of the rollers 3. Fitted on the shaft 2 is an engagement device 4 for a flexible pulling element such as a cable or chain (22 in FIGS. 4-6), on which the lifting and displacement forces can act. The engagement device 4 is situated at a distance from and essentially above the axis of the rollers, so that the force of the pulling element thereon tries to swing the pick-up device 1 relative to the rollers 3 in the direction of the force. At the shaft ends holes 5 are provided in a bush-shaped part, of which the axis runs parallel to the axis of the rollers 3 and at a distance from it between said shaft and the engagement point on the load. The shaft stub 10 of the engagement devices 6 can be inserted into these holes 5 while, as shown in FIG. 1, an in this case circular engagement projection 13 of the engagement device 6 can be inserted simultaneously into the openings 8 of the "corner casting" 9 situated on the outside of the container 7. The shaft 2 also has fitted on it projections 12 which in a certain angular position of the engagement device 6 relative to the shaft 2 engage in a recess 23 (in FIG. 7) of the stub 11 of the engagement device 6, which prevents axial movement of the engagement device 6 and the shaft 2 relative to each other. As a result, the engagement device 6 is axially locked on the shaft 2. In another angular position of the engagement device 6 relative to the shaft 2 the projection 12 does not engage in the recess 23 of the stub 11, so that the engagement device 6 can move freely in the axial direction relative to the shaft 2. This is explained in further detail below. The function of the upright plate 14 fitted on the engagement device 6 and of the cam 16 on the shaft 2 will be explained further in the following figures.

Figure 2:
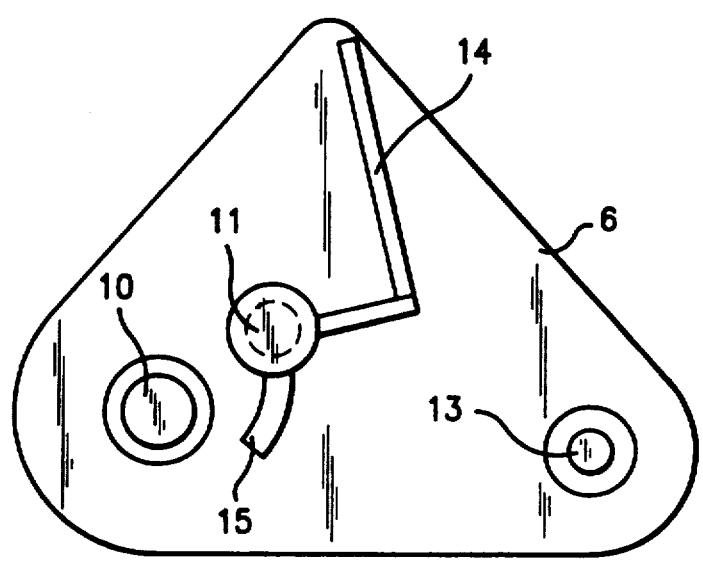
FIG. 2 is an internal view of one of the engagement devices.
Figure 3:
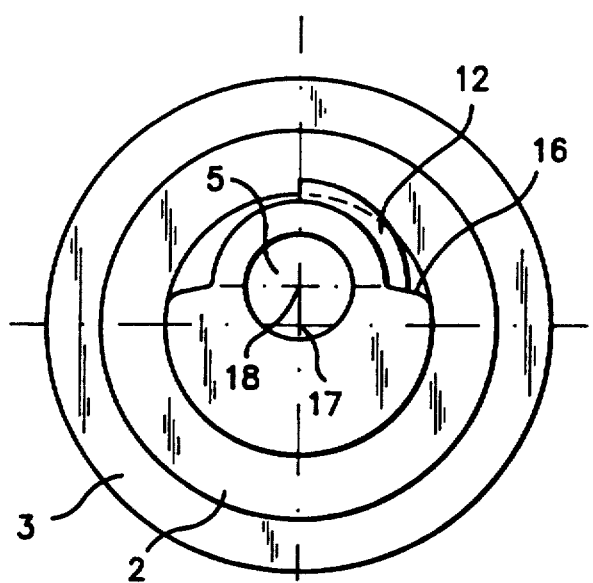
FIG. 3 is an end view of the pick-up device without engagement device thereon, viewed in the direction of the arrow III in FIG. 1.

The shaft stump 10 of the engagement device 6 in FIG. 2 can be inserted into the hole 5 of the shaft 2 of FIG. 3. The axis 18 of the hole 5 runs parallel to the axis 17 of the rollers 3 and is placed off centre relative thereto. The engagement element 13 can be inserted into an opening of a load to be picked up. The stop face 14 will in this case rest against the load. If the shaft stump 10 is inserted into the hole 5 of the shaft 2, the angle of rotation thereof is limited through the fact that the cam 15 of the engagement device 6 can come into contact with the cam 16 of the shaft 2. The way in which this embodiment of the pick-up device according to the invention works is explained now with reference to FIGS. 4 and 5.

Figure 4:
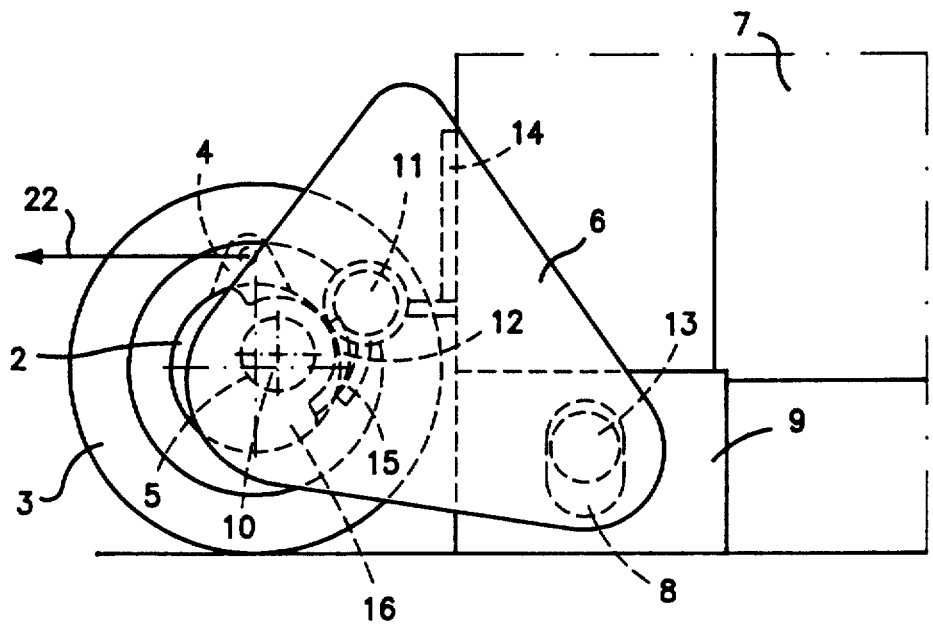
FIG. 4 is a side view of the device of FIG. 1 just before the lifting begins.

FIG. 4 shows the position just before lifting of the load, in this case a container 7, begins. The shaft 2 is taken directly in front of the front or rear side of the container 7 and the engagement devices 6 are inserted with their shaft stub 10 into the holes 5 of the shaft 2, while the engagement elements 13 are inserted into the openings 8 of the corner castings 9 at the side of the container 7. The supporting face 14 rests entirely or partially against the front side of the container 7. A cable 22, for example, is fixed on the engagement device 4, which cable can exert a force in the direction of the arrow and engages on a which (not shown) on the loading platform or tipping bridge of a lorry. Just before the lifting begins, a space exists between the cams 15, 16 of the engagement device 6 and the shaft 2 respectively, while the projection 12 of the shaft 2 does not engage in the recess 23 of the stub 11 of the engagement device 6.

Figure 5:
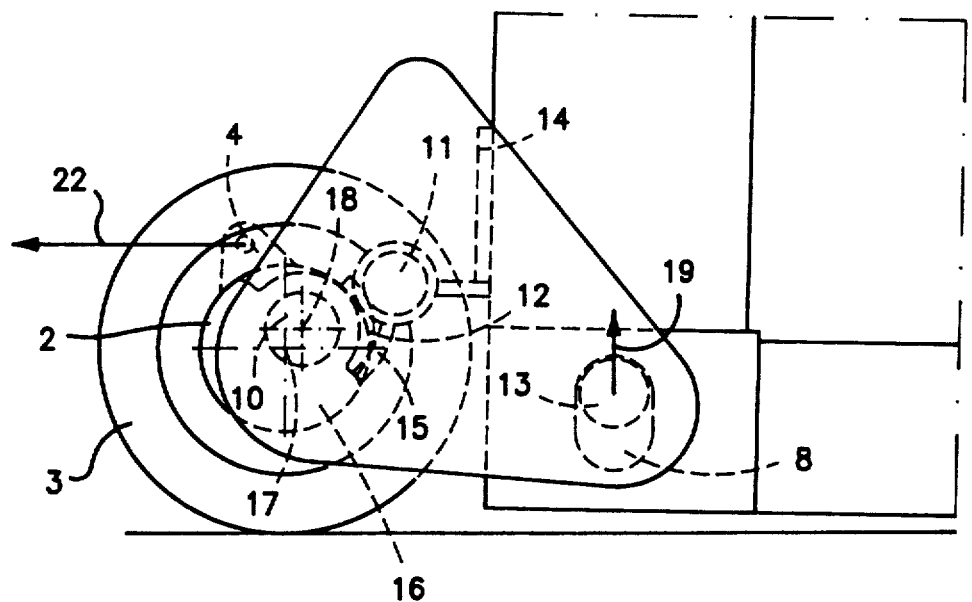
FIG. 5 is the same side view as FIG. 4 at the end of the lifting.

If now the engagement device 4 is pulled in the direction of the arrow in FIG. 4 while, for example, shortening the cable 22, the situation of FIG. 5 is produced, in which the container 7 is raised at one end. This situation comes about as follows: a sufficiently great force acting in the direction of the horizontal arrow in FIG. 5 (by pulling element 22) will cause the shaft 2 inside the rollers 3 to rotate in the direction thereof. The eccentric shaft stub 10 consequently makes a circular movement about the axis 17 of the rollers 3. Since the supporting face 14 prevents the engagement device 6 from being able to make a rotary movement in the opposite direction to this, the engagement element 13 will move in the direction of the vertical arrow in FIG. 5. At the same time, with the aid of the rollers 3, the shaft 2 will move slightly in the direction of the front side of the container 7. When the engagement element 13 presses against the top side of the opening 8, the front side of the container 7 will then be raised. During the rotary movement of the shaft 2 the projection 12 turns into the recess 23 of the stub 11, as a result of which mutual axial movement is prevented and the engagement device 6 is locked on the further device in the axial direction. This locking already takes place when the engagement element 13 is still moving freely upwards. During the lifting movement the couple created by the force is transmitted about the axis 17 of the rollers by means of the moment arm which is determined by the horizontal distance between the axis 17 of the rollers 3 and the axis 18 of the shaft stub 10. During the lifting the distance between the cams 15 and 16 decreases. When the cams come into contact with each other the lifting is at an end. This ending comes about automatically through the fact that the couple then created by the force engaging in the engagement device 4 must be transmitted about the axis 17 of the rollers 3 by means of a much greater moment arm, namely one the size of the horizontal distance between the axis 17 of the rollers 3 and the pressure point 19 between the engagement element 13 and the opening 8. For further lifting of the front side of the container 7 a greater couple is thus needed, which necessitates an increase in the force engaging in the engagement device 4. With correct dimensioning of the moment arm the force increase needed for further lifting, in which the cams have come into contact with each other, will be greater than the force increase needed to overcome the resistance to a horizontal movement of the loading platform or the container 7 resting with its rear side still on the ground. In that desired case the container 7 is loaded onto the loading platform, while the rollers 3 travel over the loading platform.

When the loading process is completed, with decreasing force the shaft will turn back to the initial position in which the engagement element 13 drops simultaneously with the front side of the container 7, so that the container comes to rest on the loading platform.

Conversely, the container 7 can be unloaded in the same way from the loading platform, by paying out the cables. In this case the cable force must be great enough to hold the cams 15 and 16 in contact with each other.

For lifting with the pick-up device shown in FIGS. 4 and 5, it is essential that the engagement device 6 should not be able to rotate about the shaft stub 10 in a direction opposite to the direction of rotation of the shaft 2 during the lifting. In this specific case this is achieved by the supporting face 14 which rests against the front side of the container 7. There are, however, also other possibilities for counteracting this opposite rotation of the engagement device 6. For example, it can be ensured that the engagement element 13 cannot rotate freely in the opening 8. This can be achieved by, for example, making the engagement element 13 angular in shape, so that it cannot turn in the opening 8. The supporting face 14 is in that case not necessary, while when the cams 15 and 16 are in contact with each other further lifting can be continued only by transmitting the couple about the axis 17 of the rollers 3 with the aid of a moment arm which is equal to the horizontal distance between the axis 17 of the rollers 3 and the centre of gravity of the container. This relatively very large moment arm requires a relatively very great force increase which is always greater than that which is necessary for loading of the container.

Figure 6:
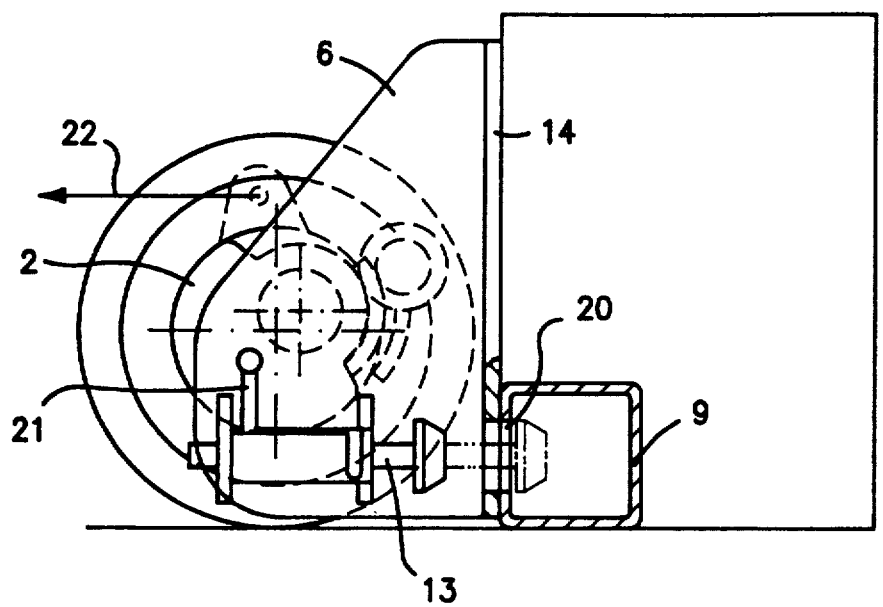
FIG. 6 is the same side view as FIGS. 4 and 5, partially in vertical section, but of a device according to the invention with a different design of the engagement devices.
Figure 7:
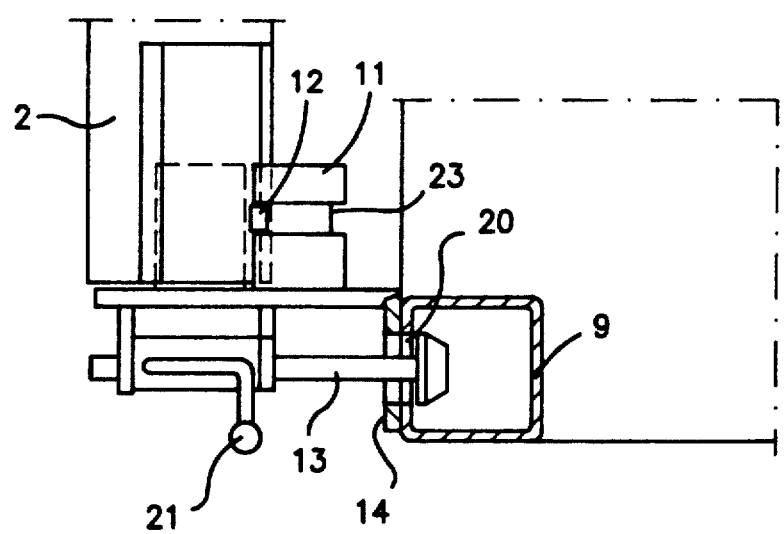
FIG. 7 is a top view of the device according to FIG. 6, partially in horizontal cross-section.

The pick-up device can be designed in various ways, and another illustrative example of an embodiment will be discussed with reference to FIGS. 6 and 7. In this case the engagement elements 13 interact with the openings 20 in the corner castings 9 at the front or rear side of the container. The engagement element 13 is formed in FIGS. 6 and 7 by a "twistlock", which by means of a lock 21 can be moved to and fro between a slid-in position and a slid-out position, in which the twistlock 13 can be inserted into an opening 20 of a corner casting and after turning a quarter turn can slot behind the edge of the opening 20. The combination of a twistlock 13 and an opening 20 in a corner casting 9 is a known technique. When the twistlock slots into the corner casting 9. the corner casting 9 is clamped between the twistlock 13 and the supporting face 14. In FIGS. 6 and 7 the twistlock 13 is moved through an opening in the supporting face 14. FIG. 6 shows the slid-in position of the twistlock and the slid-out position thereof by means of dash lines, while FIG. 7 shows the slid-out position of the twistlock. The engagement device 6 with the twistlock 13 is in this case made detachable from the shaft 2, but a non-detachable design is also possible. FIG. 7 shows again how the projection 12 on the shaft 2 can engage in a recess 23 in the stub 11 of the engagement device 6 for locking in the axial direction.

The coupling to a container 7 now takes place as follows: The supporting face 14 is placed against the container 7, the opening in the supporting face 14 being in line with the opening 20 of the corner casting 9. The twistlock is then inserted through the two openings with the aid of the lock 21 and turned a quarter turn. As a result, the corner casting 9 is confined between the twistlock 13 and the supporting face 14, so that rotation of the engagement device 6 in a direction opposite to the direction of rotation of the shaft 2 during the lifting is prevented. The lifting now takes place in the same way as is discussed with reference to FIGS. 4 and 5. When the cams 15 and 16 come into contact with each other, for further lifting the couple created by the force from the cable must be transmitted about the axis 17 of the rollers 3 with the aid of the moment arm with a length which is equal to the horizontal distance between the axis 17 of the rollers 3 and the centre of gravity of the container. The pulling force necessary for this which engages in the engagement device 4 will be many times greater than the force needed to move the container onto the loading platform.

It must also be clear that only non-limiting examples of embodiments of the invention are discussed above and that other embodiments are also possible which fall within the scope of the invention which is characterized by the features of the claims.

I claim:

1. Pick-up device for a load, comprising: first engagement means (6) for engaging on the load (7) and lifting it over a desired height, said first engagement means (6) including roller means (3) for shifting the load (7) relative to a bearing surface over which said roller means (3) can move bearing the load (7), wherein said first engagement means (6) engages the load (7) at a distance from a central axis (17) of said roller means (3); second engagement means (4) for a pulling element for moving the load (7) over said bearing surface, wherein said second engagement means (4) for said pulling element is situated at a distance from said central axis (17) of said roller means (3) such that a pulling force on said pulling element swings said first engagement means (6) relative to said roller means (3) in a direction in which the load (7) is being lifted, said first engagement means (6) being mounted to said pick-up device on an eccentric shaft lying parallel to said central axis (17) of said roller means (3) and at a distance therefrom between said central axis (17) and a point of engagement of the load (7); and cam means (15, 16) fitted on said pick-up device and on said first engagement means (6) such that pivot of said first engagement means (6) about said central axis (17) of said roller means (3) in a direction of lifting of the load (7) causes said cam means (15, 16) to engage after the load (7) has been lifted said desired height so as to prevent further pivot of said first engagement means (6) relative to said roller means (3).

2. Device according to claim 1, wherein the first engagement means (6) includes means for preventing angular rotation between the load and the first engagement means.

3. Device according to claim 1, wherein the first engagement means (6) is mounted to the pick-up device so as to permit an angular rotation about an axis (18) parallel to the central axis (17) of the roller means (3).

4. Device according to claim 3, wherein the first engagement means (6) has an upright plate (14) which can rest with a face parallel to the central axis (17) of the roller means (3) against an adjacent face of the load (7).

5. Device according to claim 1, further including bearing means (2) for supporting the roller means (3) and the second engagement means (4) for engaging a pulling element, and wherein the first engagement means (6) for engaging on the load is connected in a detachable and lockable manner to the bearing means (2).

6. Device according to claim 5, in which said first engagement means (6) is detachable and can be placed on the bearing means (2) by a movement parallel to the central axis (17) of the roller means (3).

7. Device according to claim 6, wherein the load has an engagement opening on both sides, and wherein the device (1) has first engagement means (6) at each end of the bearing means on both sides of the roller means, and wherein the first engagement means (6) has a projection (13), for engaging the engagement opening (8) of the load.

8. Device according to claim 6, wherein the first engagement means (6) and the pick-up device have a shaft stub (10) and an accommodation sleeve (5) for accommodating the shaft stub, and further include an interacting recess (23) in a plane at right angles to an axis on one of said stub and said sleeve and a projection (12) on the other of said stub and said sleeve such that, in one angular position of said first engagement means (6) relative to the pick-up device said projection (12) leaves said recess (23) free, so that the shaft stub (10) and sleeve (5) can be slid axially onto each other, while on rotation of said first engagement means (6) relative to the pick-up device to a position for lifting of the load, said projection (12) engages in said recess (23) and thus prevents axial movement of said first engagement means and said pick-up device relative to each other thereby locking the first engagement means (6) on the pick-up device in an axial direction.

9. A pick-up device for a load to be moved on a surface, comprising:

a shaft having a central axis;

roller means disposed on the shaft for rolling along the surface;

engagement means pivotably mounted to the shaft for engaging the load, the engagement means being mounted to the shaft at a distance from the central axis;

pulling means for pulling the load, the pulling means being disposed on the shaft at a distance from the central axis so that a pulling force applied to the pulling means applies a torque to the shaft so as to pivot the engagement means in a direction of lifting of the load; and cam means disposed on the shaft and the engagement means for preventing further pivot of the engagement means relative to the shaft when the load has been lifted to a desired height;

whereby subsequent pulling forces applied to the pulling means cause the load to be moved on the surface as the roller means roll along the surface.

* * * * *